United States Patent [19]

Ascoli

[11] 4,177,413

[45] Dec. 4, 1979

[54] BATTERY CHARGERS

[75] Inventor: Enzo Ascoli, Lausanne, Switzerland

[73] Assignee: The Gillette Company, Boston, Mass.

[21] Appl. No.: 861,044

[22] Filed: Dec. 15, 1977

[30] Foreign Application Priority Data

Apr. 20, 1977 [GB] United Kingdom ............... 16382/77

[51] Int. Cl.² .......................... H02J 7/00; H02M 7/04
[52] U.S. Cl. ........................................ 320/2; 307/311;
307/321; 315/135; 320/48
[58] Field of Search ..................... 320/48, 57, 59, 2, 3;
307/311, 321; 315/135

[56] References Cited

U.S. PATENT DOCUMENTS

| 2,995,695 | 8/1961 | Reich ................................. 320/51 X |
| 3,749,905 | 7/1973 | Friedman et al. .................... 320/3 X |
| 3,912,998 | 10/1975 | Harris ..................................... 320/2 |

FOREIGN PATENT DOCUMENTS

| 1933082 | 1/1971 | Fed. Rep. of Germany ............. 320/2 |
| 2509392 | 9/1975 | Fed. Rep. of Germany ............. 320/2 |
| 1115568 | 5/1968 | United Kingdom . |

Primary Examiner—Robert J. Hickey
Attorney, Agent, or Firm—Richard A. Wise; Donald E. Mahoney

[57] ABSTRACT

A charging circuit for charging a low voltage battery from an AC supply, said circuit comprising a full wave bridge rectifier, each leg of the bridge including a rectifying element, and means for providing a visual indication of normal operation of said charging circuit, wherein one of said rectifying elements is a light emitting diode to serve as said means for providing a visual indication.

4 Claims, 3 Drawing Figures

BATTERY CHARGERS

BACKGROUND OF THE INVENTION

This invention relates to battery chargers.

Low voltage rechargeable batteries are used in many appliances, for example electric dry shavers. The appliance may include at least one rechargeable battery and an integral charger comprising a charging circuit including AC input terminals, a transformer, and a full wave current rectifier. A pilot lamp is desirably connected for energization during charging to indicate normal operation of the charging circuit. Extinction of the lamp signals some malfunction of the charging operation, such as lack of mains voltage or poor contacts.

In a compact hand-held appliance, such as an electric dry shaver, space and weight are strictly limited. Consequently the batteries, transformer, current rectifier and even the charging terminals for connection to the AC mains are designed to minimum dimensions and weight. The power output of the transformer is thus very limited and must be used with maximum efficiency to permit recharging to be accomplished within an acceptable short time period.

SUMMARY OF THE INVENTION

According to the present invention there is provided a charging circuit for charging a low voltage battery from an AC supply, said circuit comprising a full wave bridge rectifier, each leg of the bridge including a rectifying element, and means for providing a visual indication of normal operation of said charging circuit, characterised in that one of said rectifying elements is a light emitting diode to serve as said means for providing a visual indication.

BRIEF DESCRIPTION OF DRAWINGS

An embodiment of the invention will now be described, by way of example, with reference to the accompanying drawings, in which.

DESCRIPTION OF PREFERRED EMBODIMENT

Figure 1:
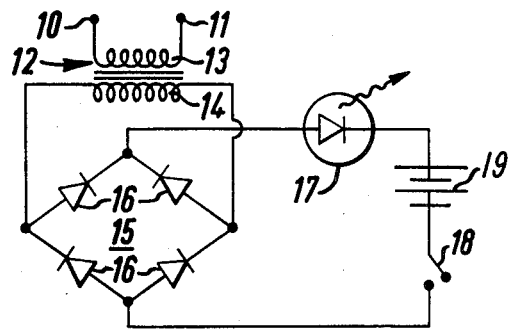
FIG. 1 is a circuit diagram of a prior art charging circuit.

Referring to FIG. 1, there is shown a charging circuit comprising AC input terminals 10, 11, a transformer 12 having primary and secondary windings 13, 14, a full wave bridge rectifier 15 comprising four conventional diodes 16, a pilot lamp 17 such as a light emitting diode, a switch 18, and one or more batteries 19 to be charged. The secondary winding 14 is connected across one diagonal of the bridge, and the lamp 17, switch 18 and battery 19 are connected in series across the other diagonal.

In use, apart from the current dependent voltage drops across the secondary winding 14 and in the battery 19, there is an additional voltage drop at any instant in two of the four diodes (say twice 0.7 volts) and across the light emitting diode (say 1.7 volts for a particular red light diode), making a total additional drop of 3.1 volts.

Figure 2:
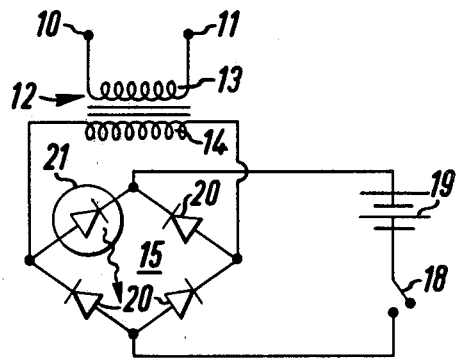
FIG. 2 is a circuit diagram of a charging circuit according to this invention.

Referring now to FIG. 2 there is shown a charging circuit also comprising AC input terminals 10, 11, transformer 12 having windings 13, 14, full wave bridge rectifier 15, switch 18 and a battery or batteries 19. However, in accordance with this invention the bridge rectifier comprises three conventional diodes 20 and a single light emitting diode 21. The transformer secondary winding 14 is connected across one diagonal of the bridge. The battery and the switch are connected in series across the other diagonal of the bridge.

In use, the additional voltage drop calculated as previously is different during the two half cycles of each cycle of the AC input current. During one half cycle there is a voltage drop in two of the three conventional diodes (twice 0.7 volts), and during the other half cycle the voltage drop is in the third conventional diode and the light emitting diode in series (0.7 volts + 1.7 volts). The additional voltage drop is thus alternately 1.4 volts and 2.4 volts, having an average over a period of time of 1.9 volts.

It will be appreciated that the power saving obtained by reducing this additional voltage drop from 3.1 volts down to 1.9 volts is significant, particularly where space and weight are required to be reduced to a minimum as for example in battery powered electric dry shavers including an integral battery charger. This power saving permits either a shorter charging time or a charger of smaller overall dimensions to be used. The light emitting diode is excited only on alternate half cycles which extends its operating life. Its level of illumination remains however perfectly acceptable.

Figure 3:
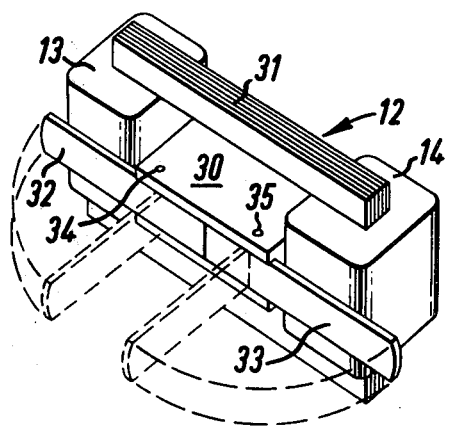
FIG. 3 is a schematic perspective view of a battery charger including the circuit of FIG. 2.

Referring to FIG. 3 there is shown, by way of example, a compact battery charger suitable for incorporation in an electric dry shaver. Similar components to those in FIG. 2 are identified by similar reference numerals.

A terminal housing 30 is disposed within the space bounded by the primary and secondary windings 13, 14, and the magnetic circuit 31 of the transformer 12. Two AC terminal pins 32 and 33 are pivoted to housing 30 by pivots 34 and 35 for movement between extended positions (shown in dotted line) for insertion in an AC mains socket, and retracted positions (shown in full line) lying flush against the housing of the appliance or within shallow recesses in the external wall thereof. The pivoted terminal pins are preferably biassed into both their extended and retracted positions, for example by cooperation with respective individual springs within housing 30 that snap over-centre as the pins are manipulated between their positions. The terminal pins make electrical contact with the input terminals 10, 11 of the transformer primary winding only when in their extended positions, the input terminals 10, 11 being within the housing 30.

I claim:

1. A charging circuit for charging a low voltage battery from an AC supply, said charging circuit comprising a full wave bridge rectifier network having four legs, a pair of input terminals connected across one diagonal of said bridge for connection to a low voltage AC charging supply, a pair of output terminals connected across the other diagonal of said bridge for connection to a battery to be charged, three of said four legs including a rectifying element presenting a first voltage drop, and said fourth leg including a light emitting diode presenting a second voltage drop exceeding said first voltage drop, said light emitting diode serving both as a rectifying element excited only on alternate half cycles of said AC charging supply and to provide a visual indication of operation of said charging circuit.

2. A charging circuit according to claim 1 wherein three of said legs of said full wave bridge rectifier network each consist only of one diode and electrical connection means, and said fourth leg consists only of said light emitting diode and electrical connection means.

3. A charging circuit according to claim 1 including electrical connection means for connecting a battery to be charged and a switch in series combination across said pair of output terminals.

4. A charging circuit according to claim 3 including electrical connection means for connecting a secondary winding of a transformer directly across said input terminals of said bridge.

* * * * *